Kipp & Lawrenson,
Fly Wheel.
Nº 17,793.    Patented July 14, 1857.
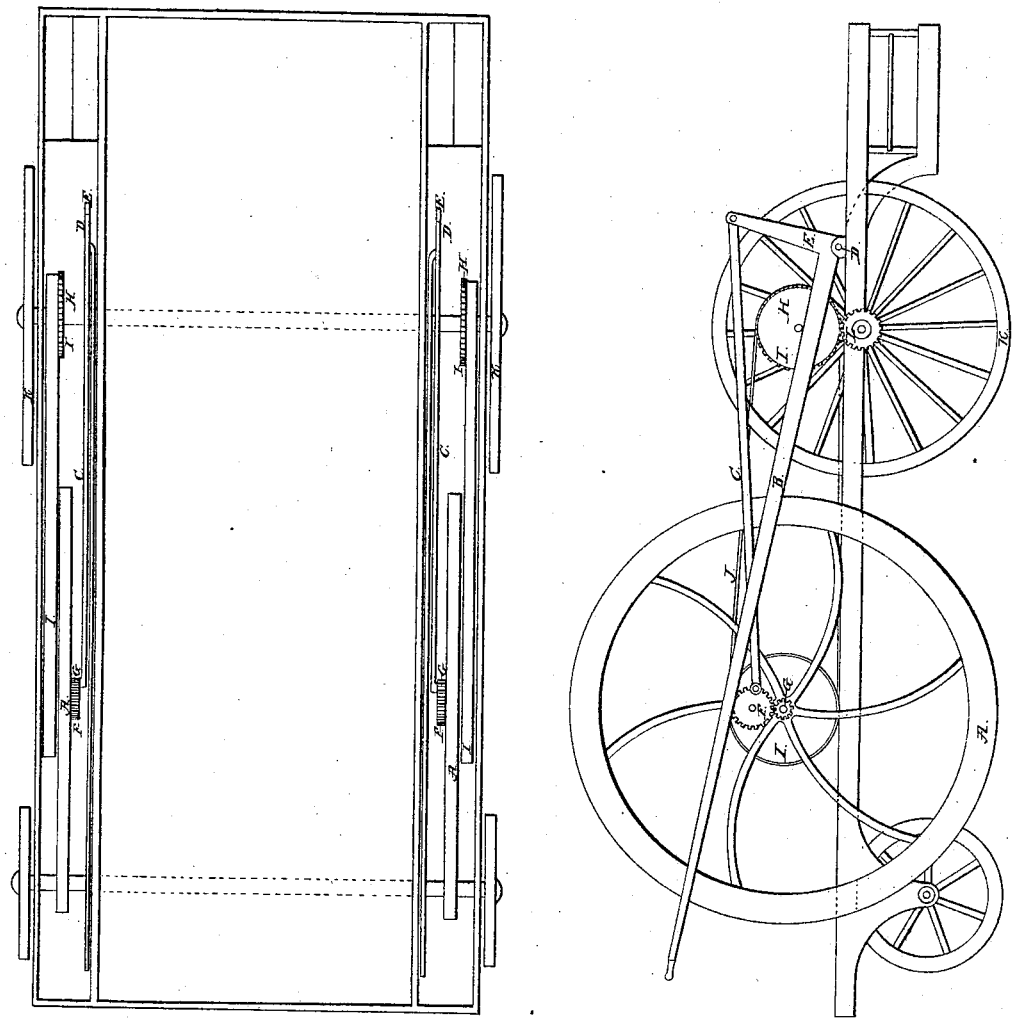

UNITED STATES PATENT OFFICE.

CHAS. T. KIPP AND JOHN LAWRENSON, OF NEW YORK, N. Y.

APPLYING FLY-WHEELS TO HAND-CARS.

Specification of Letters Patent No. 17,793, dated July 14, 1857.

*To all whom it may concern:*

Be it known that we, CHARLES T. KIPP and JOHN LAWRENSON, of the city of New York, county of New York, and State of New York, have invented a new and improved mode of applying power to be used for propelling railroad-cars in cities to supersede the use of horses in the streets; and we do hereby declare that the following is a full and exact description thereof, reference being had to the accompanying drawings and to the letters of reference marked thereon.

The nature of our invention consists in using a fly wheel, speeding it up by means of a lever placed in such a position that the fly wheel operated upon by the lever will concentrate and accumulate power, to be given forth when wanted and assist as a motive power in propelling cars and other machinery. The lever to be operated by hand or other power.

To enable others skilled in the art to make and use our invention we will proceed to describe its construction and operation.

We construct a fly wheel, A, as shown in the drawing, of sufficient weight to operate the machinery to which it is attached and apply thereto a lever B, of the proper length, which may be made longer or shorter as may be found to answer the purpose of a lever best. The lever is placed alongside the wheel as shown in the drawing and when used as a means of propelling cars is to be operated upon by hand power. Its use is made practicable by means of a rod C, thrown back from the fulcrum D connected by an elbow E to regulate the sweep of the lever. The lever elbow, and rod operate the fly wheel, by means of a cogged wheel F to which the rod is attached running into cogs placed upon the axle of the fly wheel; the cogged wheel H is for the purpose of receiving the power from the fly wheel by means of pulleys I, I, connected together by means of a band J, to be transmitted to the driving wheel K by means of a cogged wheel L.

In using our machine it is necessary to work the lever in speeding up the fly wheel, until we have obtained a rapid rate of revolution in the wheel, we then throw it into gear, and continue operating the lever by the same power, thus keeping up the speed without any loss of power, and which enables us to use the power acquired when most needed, and by this means we obtain a power which is of practicable utility in propelling railroad cars in cities, thus doing away with the use of horses as a motive power.

What we claim as our invention, and desire to secure by Letters Patent, is—

The arrangement of levers B and rods C, attached to crank wheel F for operating the fly wheel A, the whole constructed and operated as described and for the purpose set forth.

CHAS. T. KIPP.
JOHN LAWRENSON.

Witnesses as to the signature of Chas. T Kipp:
H. B. GOODRIDGE,
ABRAHAM MOSES.

Witnesses as to the signature of John Lawrenson:
ALFRED HUNTER,
JAMES LAWRENSON.